United States Patent
Tanaka et al.

[19]

[11] Patent Number: 5,568,932
[45] Date of Patent: Oct. 29, 1996

[54] METAL GASKET ASSEMBLY WITH SHIMS

[75] Inventors: Akira Tanaka; Masamichi Hoshi, both of Ohmiya, Japan

[73] Assignee: Nippon Leakless Industry Co., Ltd., Tokyo, Japan

[21] Appl. No.: 311,024

[22] Filed: Sep. 22, 1994

[30] Foreign Application Priority Data

Jun. 30, 1994 [JP] Japan .................................. 6-149275

[51] Int. Cl.$^6$ .................................................. F16J 15/08
[52] U.S. Cl. ...................................... 277/180; 277/235 B
[58] Field of Search ................................. 277/180, 235 B, 277/234, 236

[56] References Cited

U.S. PATENT DOCUMENTS

| | | | |
|---|---|---|---|
| 4,836,562 | 6/1989 | Yoshino | 277/235 B |
| 5,022,664 | 6/1991 | Kitada et al. | 277/235 B |
| 5,058,908 | 10/1991 | Udagawa | 277/235 B |
| 5,205,566 | 4/1993 | Ueta et al. | 277/180 |
| 5,240,261 | 8/1993 | Udagawa et al. | 277/235 B |
| 5,280,928 | 1/1994 | Ueta et al. | 277/180 |

FOREIGN PATENT DOCUMENTS

| | | |
|---|---|---|
| 62-261761 | 11/1987 | Japan . |
| 246572 | 10/1988 | Japan .................................. 277/235 B |
| 284644 | 11/1989 | Japan .................................. 277/235 B |
| 2-58502 | 12/1990 | Japan . |
| 106738 | 4/1993 | Japan .................................. 277/235 B |
| 11040 | 1/1994 | Japan .................................. 277/235 B |
| 129541 | 5/1994 | Japan .................................. 277/235 B |

*Primary Examiner*—Scott Cummings
*Attorney, Agent, or Firm*—Young & Thompson

[57] ABSTRACT

A metal gasket assembly for a cylinder head comprises: a metal substrate having a predetermined shape with apertures including cylinder openings, bolt holes, coolant openings and lubricant openings, which metal substrate being provided with half-beads in regions adjacent to the cylinder openings and full-beads in regions thereround; a metal sub-plate having the same planar configuration with and being thinner than the metal substrate; ring-shaped shims attached to the metal sub-plate in regions corresponding to the half-beads of the metal substrate; and a metal by-plate having the same planar configuration with the metal substrate and provided with full-beads in regions corresponding to the full-beads of the metal substrate; which metal substrate, metal sub-plate with shims and metal by-plate forming a laminated gasket assembly.

1 Claim, 3 Drawing Sheets

METAL GASKET ASSEMBLY WITH SHIMS

BACKGROUND OF THE INVENTION

1. Field of the Invention

The present invention relates to a metal gasket assembly for a cylinder head of an internal combustion engine.

2. Description of the Related Art

Conventional metal gasket assemblies of this type generally comprise several metal plates. Some of such conventional metal gasket assemblies include metal plates which are provided with full-beads in regions adjacent to cylinder openings, and shims superposed on the plates in the circumferentially inner regions of the full-beads as disclosed in Japanese Patent Publication No. 2-58502.

However, even with a conventional metal gasket assembly comprising such a metal plate that is provided with full-beads and shims, it has still been difficult to ensure effective sealing of explosive gas in recent high power engines. In order to assure effective sealing, it is necessary to increase bead resiliency by piling up many beads which are respectively formed on a metal plate. Accordingly, a conventional metal gasket assembly of this kind requires many metal plates, namely three to five of them, and thus it results in a high cost.

SUMMARY OF THE INVENTION

It is therefore an object of the present invention to provide an improved metal gasket assembly which is free from the disadvantages inherent in the conventional metal gasket assembly.

To attain the above-mentioned object, a metal gasket assembly for a cylinder head according to the first aspect of the invention comprises;

- a metal substrate having a predetermined shape with apertures including cylinder openings, bolt holes, coolant openings and lubricant openings, which metal substrate being provided with half-beads in regions adjacent to the cylinder openings and full-beads in regions therearound;
- a metal sub-plate having the same planar configuration with and being thinner than the metal substrate; and
- ring-shaped shims attached to the metal sub-plate in regions corresponding to the half-beads of the metal substrate; and
- a metal by-plate having the same planar configuration with the metal substrate and provided with full-beads in regions corresponding to the full-beads of the metal substrate;
- which metal substrate, metal sub-plate with shims and metal by-plate forming a laminated gasket assembly.

Further, a metal gasket assembly for a cylinder head according to the second aspect of the invention comprises:

- a first metal substrate having a predetermined shape with apertures including cylinder openings, bolt holes, coolant openings and lubricant openings, which metal substrate being provided with half-beads in regions adjacent to the cylinder openings and full-beads in regions therearound;
- a second metal substrate which is symmetrical with the first metal substrate with respect to a plane;
- at least one metal sub-plate having the same planar configuration with and being thinner than the first and second metal substrates; and
- ring-shaped shims attached to the at least one metal sub-plate in regions corresponding to the half-beads of the first and second metal substrates;
- which first metal substrate, second metal substrate, and at least one metal sub-plate with shims forming a laminated gasket assembly.

As mentioned above, a metal gasket assembly according to the present invention has such a basic structure that a metal substrate is provided with full-beads formed in regions surrounding cylinder openings, as well as half-beads formed in circumferentially inner regions of the full-beads, and that ring-shaped shims are attached to the metal sub-plate so that they come into contact with the half-beads on a substrate surface where the bulges of the full-beads are not situated. As a result, the sealing effect of the metal gasket assembly according to the present invention is significantly improved when compared with conventional ones, because the regions around the cylinder openings, which require the most effective sealing in the gasket assembly, are provided with dual beads of the full-beads and the half-beads, and in addition the ring-shaped shims are pressed onto the surfaces of the half-beads.

In other words, since the ring-shaped shims are superposed on the substrate metal in regions where the half-beads are situated, the metal gasket assembly has the largest thickness in these regions. Consequently, when the metal gasket assembly is fastened between a cylinder block and a cylinder head, the fastening pressure works most on these portions of the metal gasket assembly. Moreover, there is a terraced part of the half-bead on the circumferentially outer periphery of each shim, and a bulge of the full-bead on the circumferentially outer side of the half-bead, thereby constituting double or triple sealing for the cylinder opening, which exhibits an improved effect.

Also, since a dent is formed on the surface of a metal substrate between a bulge of each full-bead and an adjoining half-bead, a sealant (a coating material) tends to stand in this dent when the metal substrate is subjected to a coating, thereby further improving the sealing effect of the metal gasket assembly.

In the actual metal gasket assemblies according to the present invention, some additional metal plates may be laminated together with the metal substrate having the above-described basic structure in order to increase the applied fastening pressure and the bead rigidity. Accordingly, the sealing function can be further improved in these metal gasket assemblies.

BRIEF DESCRIPTION OF THE DRAWINGS

It should be noted that same reference numerals are used to denote the same or equivalent elements or components throughout the drawings.

DESCRIPTION OF THE PREFERRED EMBODIMENT

The present invention will be explained below in further detail with reference to the accompanying drawings.

Figure 1:
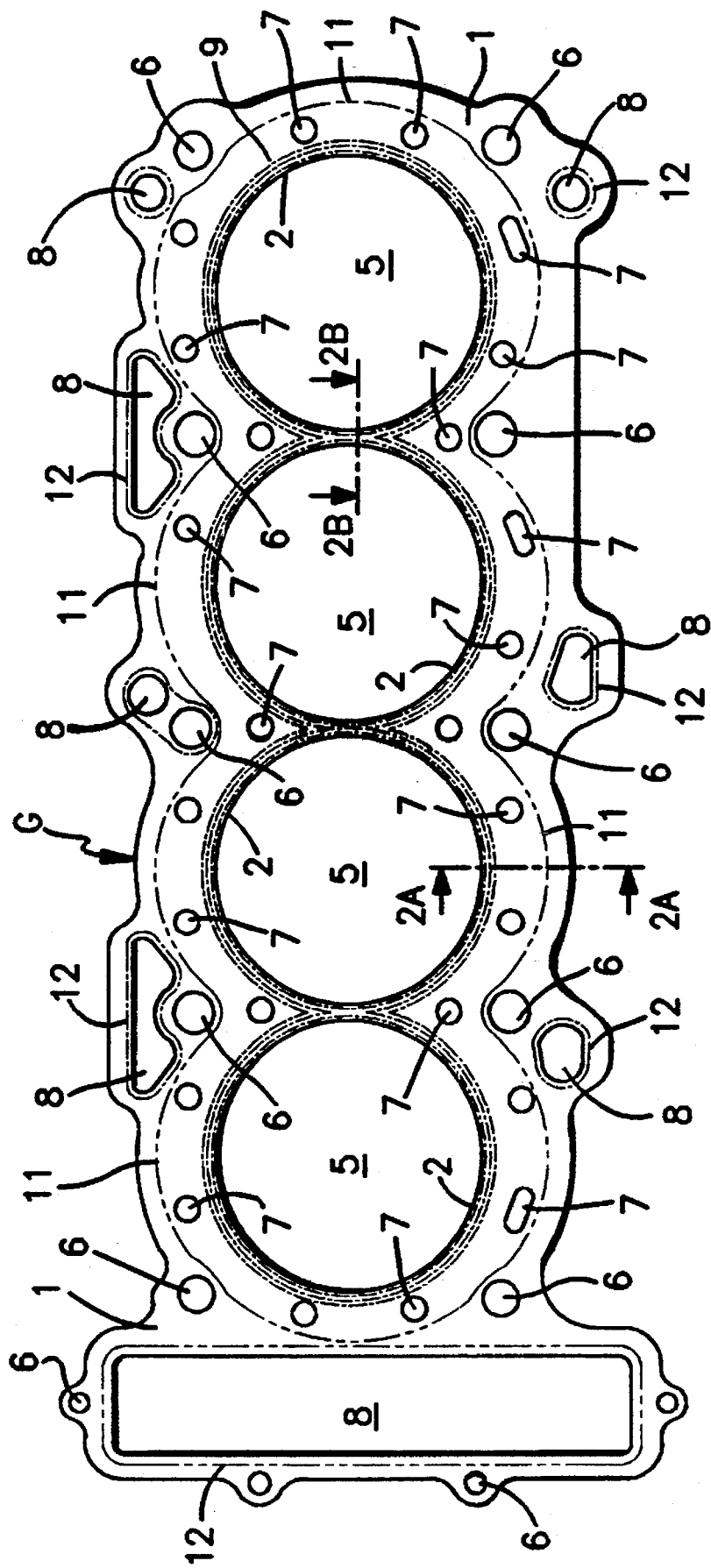
FIG. 1 is a plan view showing a metal gasket assembly according to the first embodiment of the present invention.
Figure 2A:
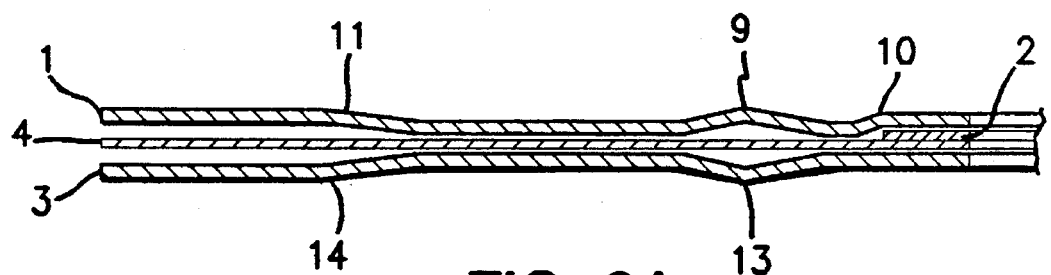
FIG. 2A is an enlarged sectional view taken along the line 2A—2A in FIG. 1.
Figure 2B:
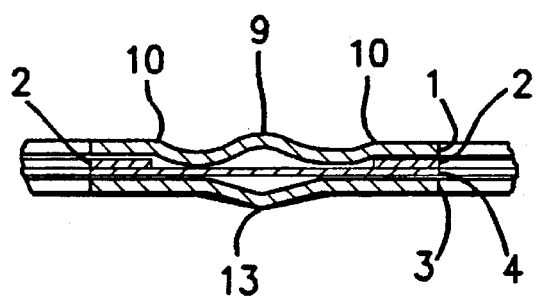
FIG. 2B is an enlarged sectional view taken along the line 2B—2B in FIG. 1.

Referring now to FIGS. 1, 2A and 2B, there is shown a metal gasket assembly according to the first embodiment of the present invention. Numerical reference 1 denotes a metal substrate, which is made of a metal sheet having a comparatively large thickness. For example, there is suitably used a stainless steel sheet (SUS 301) having a thickness of 0.2 to 0.25 mm. Numerical reference 2 denotes a shim, which is made of a metal sheet having a comparatively small thickness. For example, there is suitably used a stainless steel sheet (SUS 304) having a thickness of 0.01 to 0.1 mm. Numerical reference 3 denotes a metal by-plate, which is made of the same kind of metal sheet as the metal substrate 1. For example, there is suitably used a stainless steel sheet (SUS 301) having a thickness of 0.2 to 0.25 mm. Numerical reference 4 denotes a metal sub-plate, which is made of a metal sheet having a smaller thickness than that of the metal substrate 1. For example, there is suitably used a stainless steel sheet (SUS 304) having a thickness of 0.1 to 0.15 mm. Numerical reference 5 denotes a cylinder opening; 6, a bolt hole; 7, a coolant opening; and 8, a lubricant opening.

In this metal gasket assembly, the metal substrate 1 is formed into a predetermined shape having apertures such as the cylinder openings 5, the bolt holes 6, the coolant openings 7, and the lubricant openings 8. The metal substrate 1 further has full-beads 9 provided in regions surrounding the cylinder openings 5, and half-beads 10 provided in circumferentially inner regions thereof. Other half-beads 11 and 12 are also provided on the metal substrate 1 in regions around the coolant openings 7 and in regions surrounding the lubricant openings 8, respectively. The metal by-plate 3 is formed to have the same planar configuration as the metal substrate 1, and provided with full-beads 13 in regions surrounding the cylinder openings 5 and half-beads 14 in regions around the coolant openings 7. The metal sub-plate 4 also has the same planar configuration as the metal substrate 1, although it is thinner than the substrate 1. The ring-shaped shims 2 are laser-welded to one surface of the metal sub-plate 4 in regions surrounding the cylinder openings 5. The metal sub-plate 4 is superposed on the metal substrate 1 so that each shim 2 thereon comes into contact with the half-bead 10 of the substrate 1 on a surface where bulges of the full-beads 9 are not situated. Then, the metal by-plate 3 is further attached onto the metal sub-plate 4 so that a bulge of each full-bead 13 of the metal by-plate 3 is situated back to back with a bulge of the corresponding full-bead 9 of the metal substrate 1.

Figure 3A:
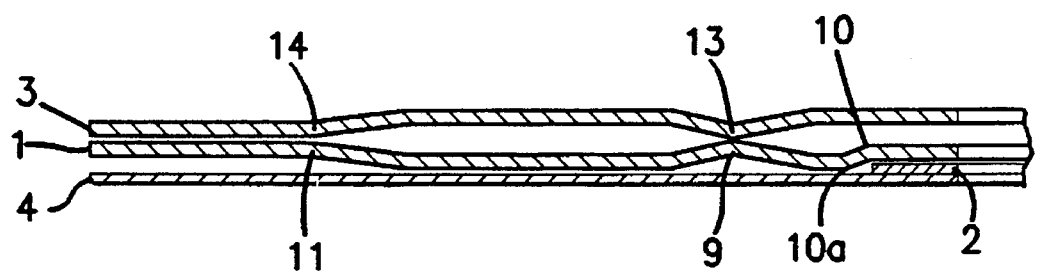
FIG. 3A is an enlarged sectional view showing a part of a metal gasket assembly according to the second embodiment of the present invention, which corresponds to the portion shown in FIG. 2A.
Figure 3B:
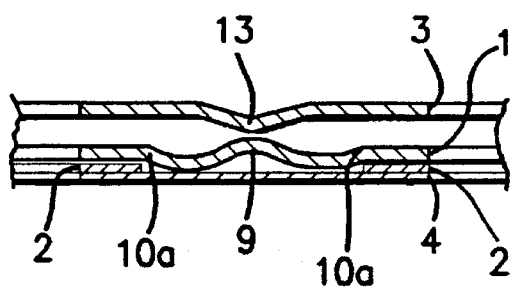
FIG. 3B is an enlarged sectional view showing a part of a metal gasket assembly according to the second embodiment of the present invention, which corresponds to the portion shown in FIG. 2B.

Referring to FIGS. 3A and 3B, there is shown a metal gasket assembly according to the second embodiment of the present invention. This metal gasket assembly is the same as that of the first embodiment except that the metal by-plate 3 is superposed onto the metal substrate 1 instead of the metal sub-plate 4 so that the bulge of each full-bead 13 of the metal by-plate 3 is confronted with the bulge of the corresponding full-bead 9 of the metal substrate 1.

Figure 4A:
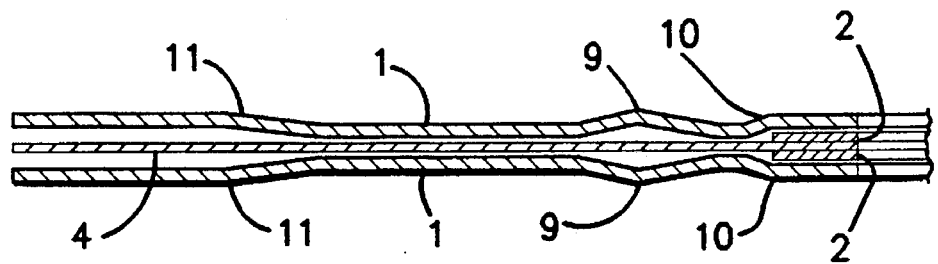
FIG. 4A is an enlarged sectional view showing part of a metal gasket assembly according to the third embodiment of the present invention, which corresponds to the portion shown in FIG. 2A.
Figure 4B:
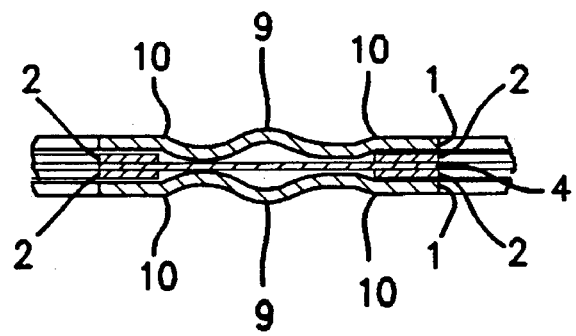
FIG. 4B is an enlarged sectional view showing a part of a metal gasket assembly according to the third embodiment of the present invention, which corresponds to the portion shown in FIG. 2B.

Referring to FIGS. 4A and 4B, there is shown a metal gasket assembly according to the third embodiment of the present invention. In this metal gasket assembly, two metal substrates 1, which are symmetrical with respect to a plane, are formed of a metal sheet having comparatively larger thickness. Each of the metal substrates 1 has a predetermined shape having apertures such as cylinder openings 5, bolt holes 6, coolant openings 7, and lubricant openings 8. The metal substrates 1 further have full-beads 9 provided in regions surrounding the cylinder openings 5, and half-beads 10 provided in circumferentially inner regions thereof. A metal sub-plate 4 is made of a metal sheet thinner than those for the metal substrates 1, and shaped to have the same planar configuration with the metal substrates 1. Ring-shaped shims 2 are laser-welded to both surfaces of the metal sub-plate 4 in regions surrounding the cylinder openings 5. The two metal substrates 1 and the metal sub-plate 4 are laminated so that a bulge of each full-bead 9 of one metal substrate 1 is situated back to back with a bulge of the corresponding full-bead 9 of the other metal substrate 1, with the metal sub-plate 4 arranged therebetween.

Figure 5A:
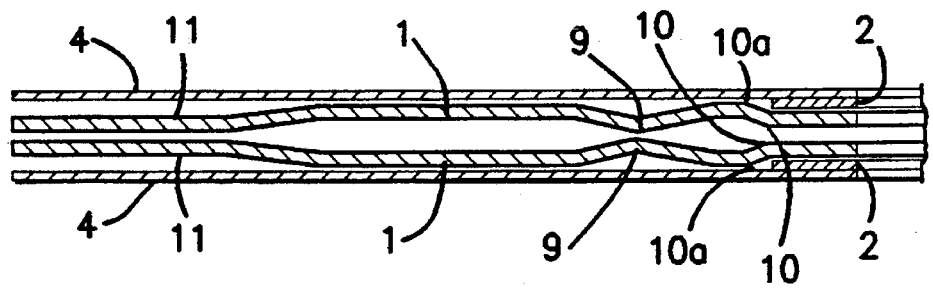
FIG. 5A is an enlarged sectional view showing a part of a metal gasket assembly according to the fourth embodiment of the present invention, which corresponds to the portion shown in FIG. 2A.
Figure 5B:
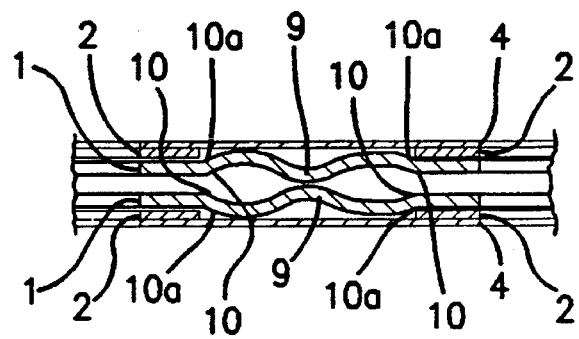
FIG. 5B is an enlarged sectional view showing a part of a metal gasket assembly according to the fourth embodiment of the present invention, which corresponds to the portion shown in FIG. 2B.

Referring to FIGS. 5A and 5B, there is shown a metal gasket assembly according to the fourth embodiment of the present invention. This metal gasket assembly includes two metal sub-plates 4 as well as two plane-symmetric metal substrates it which are the same as those in the metal gasket assembly according to the third embodiment of the present invention. In this metal gasket assembly, the two metal sub-plates 4 are respectively made of a metal sheet thinner than those for the metal substrates 1 and shaped to have the same planar configuration with the metal substrates 1; and ring-shaped shims 2 are laser-welded to either surface of the respective metal sub-plates 4 in regions surrounding the cylinder openings 5. One metal sub-plate 4 is superposed on one metal substrate 1 so that each shim 2 on the sub-plate 4 comes into contact with the half-bead 10 of the substrate 1 on a surface 10a where bulges of the full-beads 9 are not situated. The remaining substrate 1 and sub-plate 4 are also combined in the same manner. Then, the resulting two combinations are brought together so that a bulge of each full-bead 9 of one metal substrate 1 is confronted with a bulge of the corresponding full-bead 9 of the other metal substrate 1.

As mentioned above, a metal gasket assembly according to the present invention has such a basic structure that a metal substrate 1 is provided with full-beads 9 formed in regions surrounding cylinder openings 5, as well as half-beads 10 formed in circumferentially inner regions of the full-beads 9. In addition, ring-shaped shims 2 are attached to the metal substrate 1 so that they come into contact with the half-beads 10 on a substrate surface side where the bulges of the full-beads 9 are not situated. The sealing effect of the metal gasket assembly according to the present invention is significantly improved when compared with conventional ones, because the regions around the cylinder openings 5, which require the most effective sealing in the gasket assembly, are provided with dual beads of the full-beads 9 and the half-beads 10, and in addition the ring-shaped shims 2 are pressed. onto the surfaces of the half-beads.

In other words, since the ring-shaped shims 2 are superposed on the substrate metal 11 in regions where the half-beads 10 are situated, the metal gasket assembly has the largest thickness in these regions. Consequently, when the metal gasket assembly is fastened between a cylinder block and a cylinder head, the fastening pressure works most on these portions of the metal gasket assembly. Moreover, there is a terraced part of the half-bead 10 on the circumferentially outer periphery of each shim 2, and a bulge of the full-bead 9 on the circumferentially outer side of the half-bead 10, thereby constituting double or triple sealing for the cylinder opening 5, which exhibits an improved effect.

Also, since a dent is formed on the surface of a metal substrate 1 between a bulge of each full-bead 9 and an adjoining half-bead 10, a sealant tends to stand in this dent when the metal substrate 1 is subjected to a coating, thereby further improving the sealing effect of the metal gasket assembly.

In the actual metal gasket assemblies according to the present invention, some additional metal plates are laminated together with the metal substrate having the above-described basic structure in order to increase the applied fastening pressure and the bead rigidity. Accordingly, the sealing function can be further improved in these metal gasket assemblies.

Incidentally, since a metal sub-plate 4 onto which shims 2 are welded is made of a flat metal sheet in the present invention, it provides excellent processability, thereby making the welding of the shims 2 easy.

While the present invention has been described with reference to certain preferred embodiments, they were given by way of examples only. It is of course that various changes and modifications may be made without departing from the scope of the present invention as defined by the appended claims.

We claim:

1. A metal gasket assembly for a cylinder head comprising:

a metal substrate having a predetermined shape with apertures including cylinder openings, bolt holes, coolant openings and lubricant openings, said metal substrate being provided with half-beads in regions adjacent to the cylinder openings and full-beads in regions therearound;

a metal sub-plate having the same planar configuration with and being thinner than said metal substrate;

ring-shaped shims attached to said metal sub-plate in regions corresponding to the half-beads of said metal substrate; and a metal by-plate having the same planar configuration with said metal substrate and provided with full-beads in regions corresponding to the full-beads of said metal substrate but being free from half-beads in regions corresponding to the half-beads of said metal substrate;

said metal substrate, said metal sub-plate with shims and said metal by-plate being laminated such that a bulge of each full-bead of said metal substrate is situated back to back with and extends in an opposite direction from the corresponding full-bead of said metal by-plate.

* * * * *